US009817230B2

(12) United States Patent
Yamada et al.

(10) Patent No.: US 9,817,230 B2
(45) Date of Patent: Nov. 14, 2017

(54) OPTICAL SCANNER APPARATUS

(71) Applicants: Tsukasa Yamada, Tokyo (JP); Hisamichi Sekine, Tokyo (JP); Hisanori Aga, Tokyo (JP); Toyoki Tanaka, Tokyo (JP)

(72) Inventors: Tsukasa Yamada, Tokyo (JP); Hisamichi Sekine, Tokyo (JP); Hisanori Aga, Tokyo (JP); Toyoki Tanaka, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 135 days.

(21) Appl. No.: 14/887,557

(22) Filed: Oct. 20, 2015

(65) Prior Publication Data

US 2016/0116733 A1  Apr. 28, 2016

(30) Foreign Application Priority Data

Oct. 28, 2014 (JP) ................. 2014-218994

(51) Int. Cl.
*G02B 26/08* (2006.01)
*G02B 26/10* (2006.01)

(52) U.S. Cl.
CPC ....... *G02B 26/105* (2013.01); *G02B 26/0858* (2013.01)

(58) Field of Classification Search
CPC ................. G02B 26/105; G02B 26/0858
USPC ......... 359/213.1, 199.4, 224.1; 257/98, 435; 438/27
See application file for complete search history.

(56) References Cited

U.S. PATENT DOCUMENTS

| 5,648,618 | A | 7/1997 | Neukermans et al. |
| 8,570,502 | B2 | 10/2013 | Richter et al. |
| 8,896,897 | B2 * | 11/2014 | Pinter ............... G02B 26/0833 |
| | | | 250/236 |
| 2002/0044327 | A1 | 4/2002 | Fujita et al. |
| 2002/0122217 | A1 | 9/2002 | Nakajima |
| 2006/0098059 | A1 | 5/2006 | Ohguro et al. |
| 2010/0128335 | A1 * | 5/2010 | Maeda ............... G02B 26/0841 |
| | | | 359/224.1 |
| 2012/0080612 | A1 * | 4/2012 | Grego ............... G02B 26/0858 |
| | | | 250/458.1 |
| 2012/0160557 | A1 | 6/2012 | Yamada et al. |

(Continued)

FOREIGN PATENT DOCUMENTS

| EP | 2490063 | 8/2012 |
| EP | 2781950 | 9/2014 |
| JP | 2009-086050 | 4/2009 |

(Continued)

OTHER PUBLICATIONS

JPO Translation of JP 2010-026192 A.*
JPO Translation of JP 2011-186124 A.*
Extended European search report dated Mar. 4, 2016.

Primary Examiner — Bumsuk Won
Assistant Examiner — Collin X Beatty
(74) Attorney, Agent, or Firm — IPUSA, PLLC

(57) ABSTRACT

An optical scanner apparatus that oscillates a mirror to scan incident light, includes an optical scanner unit that includes a sensor that detects an oscillation angle of the mirror, and an interconnect connected to the sensor; and a shading unit that shades the sensor and the interconnect from stray light of the incident light and ambient light.

8 Claims, 16 Drawing Sheets

(56) References Cited

U.S. PATENT DOCUMENTS

2013/0083378 A1    4/2013   Tanaka et al.

FOREIGN PATENT DOCUMENTS

| JP | 2010-026192 | 2/2010 |
| JP | 2010-266508 | 11/2010 |
| JP | 2011-186124 | 9/2011 |

* cited by examiner

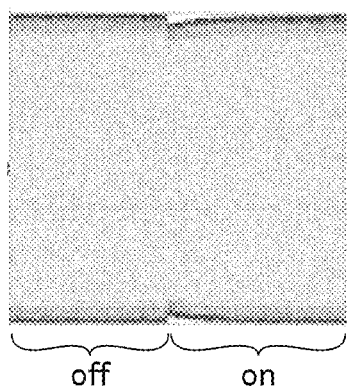
FIG.11A
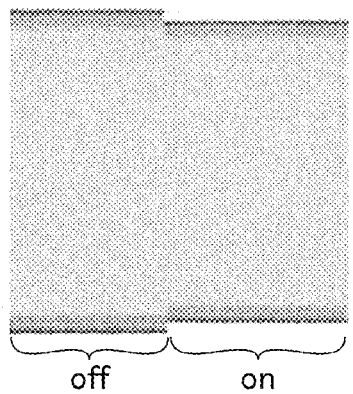
FIG.11B
FIG.11C
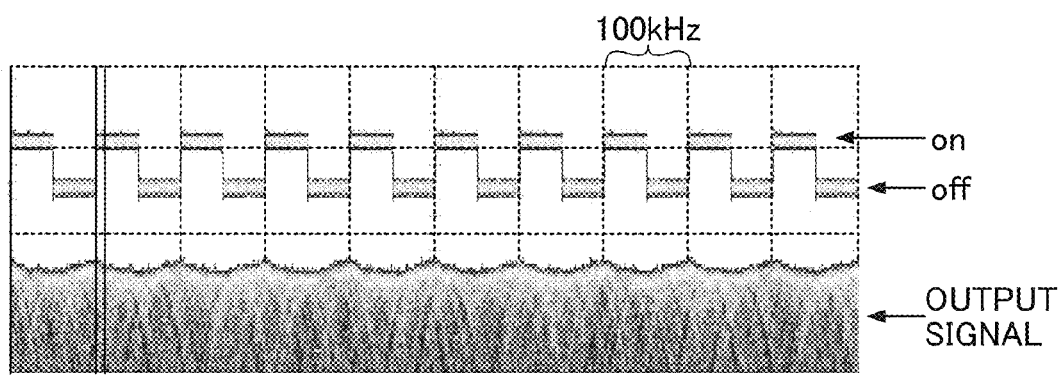

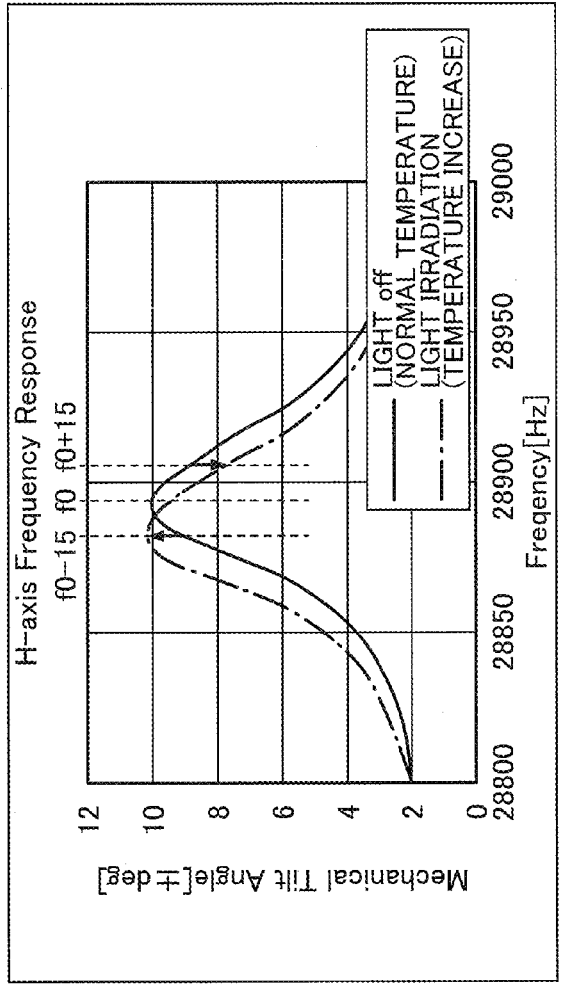
FIG.12A
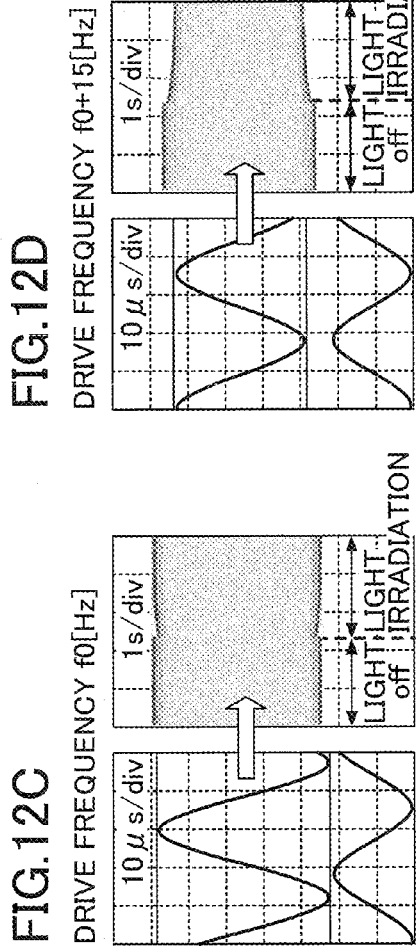
FIG.12B
FIG.12C
FIG.12D

OPTICAL SCANNER APPARATUS

CROSS-REFERENCE TO RELATED APPLICATION

The present application is based on and claims the benefit of priority of Japanese Priority Application No. 2014-218994 filed on Oct. 28, 2014, the entire contents of which are hereby incorporated by reference.

BACKGROUND OF THE INVENTION

1. Field of the Invention

The present invention relates to an optical scanner apparatus.

2. Description of the Related Art

Conventionally, an optical scanner apparatus is known that includes an optical scanner unit including a mirror, and in which incident light such as laser light or the like is reflected by rotating the mirror around a rotation axis. In this optical scanner apparatus, a sensor is provided that detects an oscillation angle of the mirror under a status that the mirror is driven and oscillated, and inclination of the mirror is detected based on the output signal of the sensor to drive and control the mirror (Patent Documents 1 and 2, for example).

However, there is a case where a sensor for detecting an oscillation angle of the mirror and a sensor interconnect connected to the sensor are provided in the optical scanner unit in the optical scanner apparatus. In such a case, there is a problem that if light (stray light of laser light or ambient light) is irradiated on the sensor or the sensor interconnect, an output signal of the sensor is varied, and as a result, driving of the mirror cannot be appropriately controlled.

PATENT DOCUMENTS

[Patent Document 1] Japanese Laid-open Patent Publication No. 2010-26192
[Patent Document 2] Japanese Laid-open Patent Publication No. 2011-186124

SUMMARY OF THE INVENTION

The present invention is made in light of the above problems, and provides an optical scanner apparatus capable of reducing variation of an output signal of a sensor that detects an oscillation angle of a mirror.

According to an embodiment, there is an optical scanner apparatus (200, 200A) that oscillates a mirror (110) to scan incident light, including an optical scanner unit (100) that includes a sensor (191) that detects an oscillation angle of the mirror, and an interconnect (199) connected to the sensor; and a shading unit (400, 410) that shades the sensor and the interconnect from stray light of the incident light and ambient light Here, the above reference numerals in brackets are described just for facilitating understandings and just an example. Thus, the present invention is not limited to the embodiments as illustrated in drawings.

BRIEF DESCRIPTION OF THE DRAWINGS

Other objects, features and advantages of the present invention will become more apparent from the following detailed description when read in conjunction with the accompanying drawings.

FIG. 11A to FIG. 11C are views illustrating an example of experimental results of variation of an output signal of a piezo-electric sensor (No. 1);

FIG. 12A to FIG. 12D are views illustrating an example of experimental results of variation of an output signal of the piezo-electric sensor (No. 2);

DETAILED DESCRIPTION OF THE PREFERRED EMBODIMENTS

Figure 1:
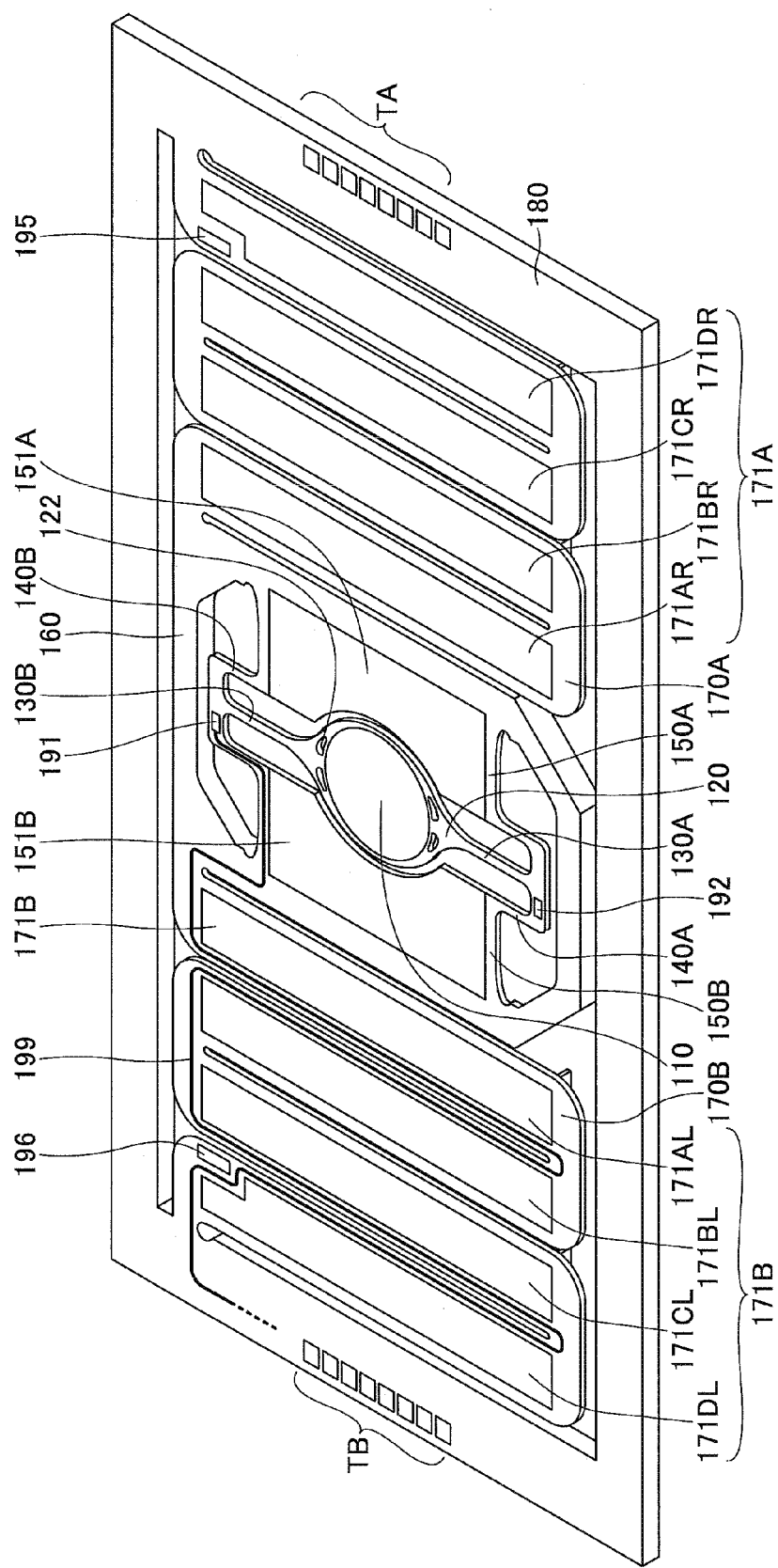
FIG. 1 is a perspective view illustrating an example of an optical scanner unit of an optical scanner apparatus of a first embodiment at a front surface side.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

(First Embodiment)

FIG. 1 is a perspective view illustrating an example of an optical scanner unit 100 of an optical scanner apparatus of the first embodiment at a front surface side. The optical scanner unit 100 illustrated in FIG. 1 is a portion that scans incident light irradiated from a light source such as laser or the like by oscillating a mirror, and is a MEMS (Micro Electro Mechanical System) mirror or the like that drives the mirror by a piezo-electric element, for example.

Specifically, the optical scanner unit 100 includes a mirror 110, a mirror support portion 120, torsion beams 130A and 130B, connecting beams 140A and 140B, first driving beams 150A and 150B, a movable frame 160, second driving beams 170A and 170B and a fixed frame 180. The first driving beams 150A and 150B include driving sources 151A and 151B, respectively. The second driving beams 170A and 170B include driving sources 171A and 171B, respectively. The first driving beams 150A and 150B and the second driving beams 170A and 170B function as actuators that scan laser light by oscillating the mirror 110 in upper-lower or left-right directions.

The mirror support portion 120 is provided with slits 122 along a circumference of the mirror 110. By providing the slits 122, the mirror support portion 120 can be lightened so that torsion by the torsion beams 130A and 130B can be appropriately transmitted to the mirror 110.

In the optical scanner unit 100, the mirror 110 is supported at a front surface of the mirror support portion 120, and the mirror support portion 120 is connected to end portions of the torsion beams 130A and 130B that are provided at both sides of the mirror support portion 120. The torsion beams 130A and 130B form an oscillating axis, and supports the mirror support portion 120 from both sides in an axial direction by extending in the axial direction. When the torsion beams 130A and 130B are distorted, the mirror 110 supported by the mirror support portion 120 is oscillated so that reflected light irradiated on the mirror 110 is scanned. The torsion beams 130A and 130B are connected to be supported by the connecting beams 140A and 140B, and further connected to the first driving beams 150A and 150B, respectively.

The first driving beams 150A and 150B, the connecting beams 140A and 140B, the torsion beams 130A and 130B, the mirror support portion 120 and the mirror 110 are surrounded by the movable frame 160. One side of each of the first driving beams 150A and 150B is supported by the movable frame 160. The other side of the first driving beam 150A extends an inner side to be connected to the connecting beams 140A and 140B. The other side of the first driving beam 150B also extends an inner side to be connected to the connecting beams 140A and 140B.

The first driving beams 150A and 150B are provided as a pair in a direction perpendicular to the torsion beams 130A and 130B such that to interpose the mirror 110 and the mirror support portion 120 therebetween. The driving sources 151A and 151B are provided at front surfaces of the first driving beams 150A and 150B, respectively. Each of the driving sources 151A and 151B includes a thin film piezo-electric element formed on the front surface of the respective driving source 151A or 151B, an upper electrode that is formed at an upper surface of the piezo-electric element and a lower electrode that is formed at a lower surface of the piezo-electric element. Each of the driving sources 151A and 151B extends or shrinks in accordance with polar of the drive voltage that is applied to the upper electrode and the lower electrode.

Thus, by alternately applying drive voltages of different phases to the first driving beam 150A and the first driving beam 150B, respectively, the first driving beam 150A and the first driving beam 150B alternately oscillate opposite directions (upper or lower) at left-right sides of the mirror 110. With this configuration, the mirror 110 can be oscillated around an axis while having the torsion beams 130A and 130B as an oscillating axis or a rotation axis. Hereinafter, a direction in which the mirror 110 is oscillated around the axis of the torsion beams 130A and 130B is referred to as a "horizontal direction". For example, a resonance frequency is used for horizontal driving by the first driving beams 150A and 150B and it is possible to drive the mirror 110 to be oscillated at a high speed.

One end of each of the second driving beams 170A and 170B is connected to an outer side of the movable frame 160, respectively. The second driving beams 170A and 170B are provided as a pair to interpose the movable frame 160 therebetween from left-right sides, respectively. The second driving beam 170A includes plural beams which are extending in parallel with respect to the first driving beam 150A where adjacent beams are connected with each other at respective ends to form a zig-zag shape as a whole. The other end of the second driving beam 170A is connected to an inner side of the fixed frame 180. Similarly, the second driving beam 170B includes plural beams which are extending in parallel with respect to the first driving beam 150B where adjacent beams are connected with each other at respective ends to form a zig-zag shape as a whole. The other end of the second driving beam 170B is connected to an inner side of the fixed frame 180.

The driving sources 171A and 171B are formed on front surfaces of each of the rectangular beams, not including curbed portions, of the second driving beams 170A and 170B, respectively. In this embodiment, the driving source 171A includes driving sources 171AR, 171BR, 171CR and 171DR aligned from the movable frame 160 to a right side. The driving source 171B includes driving sources 171AL, 171BL, 171CL and 171DL aligned from the movable frame 160 to a left side. In this embodiment, each of the driving sources 171AR, 171BR, 171CR and 171DR of the driving source 171A includes a lower electrode, a thin film of a piezo-electric element and an upper electrode formed in this order on the respective rectangular beam of the second driving beam 170A. Similarly, each of the driving sources 171DL, 171CL, 171BL and 171AL of the driving source 171B includes a lower electrode, a thin film of a piezo-electric element and an upper electrode formed in this order on the respective rectangular beam of the second driving beam 170B.

In the second driving beams 170A and 170B, by applying driving voltages of different polarities to the adjacent driving sources 171A and 171B of the adjacent rectangular beams, the adjacent rectangular beams are warped in the opposite directions in the upper and lower direction. Thus, the accumulated movement of the rectangular beams in the upper and lower direction is transmitted to the movable frame 160. The second driving beams 170A and 170B oscillate the mirror 110 in the vertical direction, which is perpendicular to the horizontal direction by this operation. For example, for the vertical driving by the second driving beams 170A and 170B, a non-resonance frequency may be used.

At this time, by driving the driving sources 171AR, 171AL, 171CR and 171CL by the same waveform, and the driving sources 171BR, 171BL, 171DR and 171DL by the waveform with different phase from that for the driving sources 171AR, 171AL, 171CR and 171CL, the mirror 110 can be oscillated in the vertical direction.

Drive interconnects that apply a drive voltage to the upper electrode and the lower electrode of the driving source 151A are connected to predetermined terminals of the group of terminals TA provided at the fixed frame 180. Drive interconnects that apply a drive voltage to the upper electrode and the lower electrode of the driving source 151B are connected to predetermined terminals of the group of terminals TB provided at the fixed frame 180. Drive interconnects that apply a drive voltage to the upper electrode and the lower electrode of the driving source 171A are connected to predetermined terminals of the group of terminals TA provided at the fixed frame 180. Drive interconnects that apply a drive voltage to the upper electrode and the lower electrode of the driving source 171B are connected to predetermined terminals of the group of terminals TB provided at the fixed frame 180.

Further, the optical scanner unit 100 includes piezo-electric sensors 191 and 192 as horizontal oscillation angle sensors for detecting inclination of the mirror 110 in the horizontal direction (oscillation angle in the horizontal direction) when the mirror 110 is oscillated in the horizontal direction as a drive voltage is applied to the driving sources 151A and 151B. The piezo-electric sensor 191 is provided at the connecting beam 140B and the piezo-electric sensor 192 is provided at the connecting beam 140A. In this embodiment, the piezo-electric sensor 192 is a dummy sensor for keeping weight balance of the connecting beams 140A and 140B.

The optical scanner unit 100 includes piezo-electric sensors 195 and 196 as vertical oscillation angle sensors for detecting inclination of the mirror 110 in the vertical direction (oscillation angle in the vertical direction) when the mirror 110 is oscillated in the vertical direction as drive voltages are applied to the driving sources 171A and 171B. The piezo-electric sensor 195 is provided at one of rectangular beams of the second driving beam 170A and the piezo-electric sensor 196 is provided at one of rectangular beams of the second driving beam 170B.

The piezo-electric sensor 191 outputs a current value corresponding to a displacement of the connecting beam 140B transmitted from the torsion beam 130B in accordance with inclination of the mirror 110 in the horizontal direction. The piezo-electric sensor 195 outputs a current value corresponding to a displacement of the rectangular beam at which the piezo-electric sensor 195 is provided of the second driving beam 170A in accordance with inclination of the mirror 110 in the vertical direction. The piezo-electric sensor 196 outputs a current value corresponding to a displacement of the rectangular beam at which the piezo-electric sensor 196 is provided of the second driving beam 170B in accordance with inclination of the mirror 110 in the vertical direction.

In this embodiment, the inclination of the mirror 110 in the horizontal direction is detected using the output of the piezo-electric sensor 191. Further, in this embodiment, the inclination of the mirror 110 in the vertical direction is detected using the outputs of the piezo-electric sensors 195 and 196. Here, in this embodiment, an inclination detection unit that detects inclination of the mirror 110 based on the current values output from the piezo-electric sensors may be provided outside of the optical scanner unit 100. Further, in this embodiment, a drive control unit that controls drive voltages to supply to the driving sources 151A and 151B and the driving sources 171A and 171B based on the detected result by the inclination detection unit may be provided outside of the optical scanner unit 100.

Each of the piezo-electric sensors 191, 195 and 196 includes a thin-film piezo-electric element, an upper electrode formed at an upper surface of the piezo-electric element and a lower electrode formed at a lower surface of the piezo-electric element. In this embodiment, the output of each of the piezo-electric sensors becomes a current value of sensor interconnects that are connected to each of the upper electrode and the lower electrode.

Each sensor interconnect 199 extended from each of the upper electrode and the lower electrode of the piezo-electric sensor 191 is connected to a predetermined terminal of the group of terminals TB provided at the fixed frame 180. Each of sensor interconnects (not illustrated in the drawings) extended from each of the upper electrode and the lower electrode of the piezo-electric sensor 195 is connected to a predetermined terminal of the group of terminals TA provided at the fixed frame 180. Each of sensor interconnects (not illustrated in the drawings) extended from each of the upper electrode and the lower electrode of the piezo-electric sensor 196 is connected to a predetermined terminal of the group of terminals TB provided at the fixed frame 180. A sensor interconnect may not be connected to the piezo-electric sensor 192, which is the dummy sensor.

Figure 2:
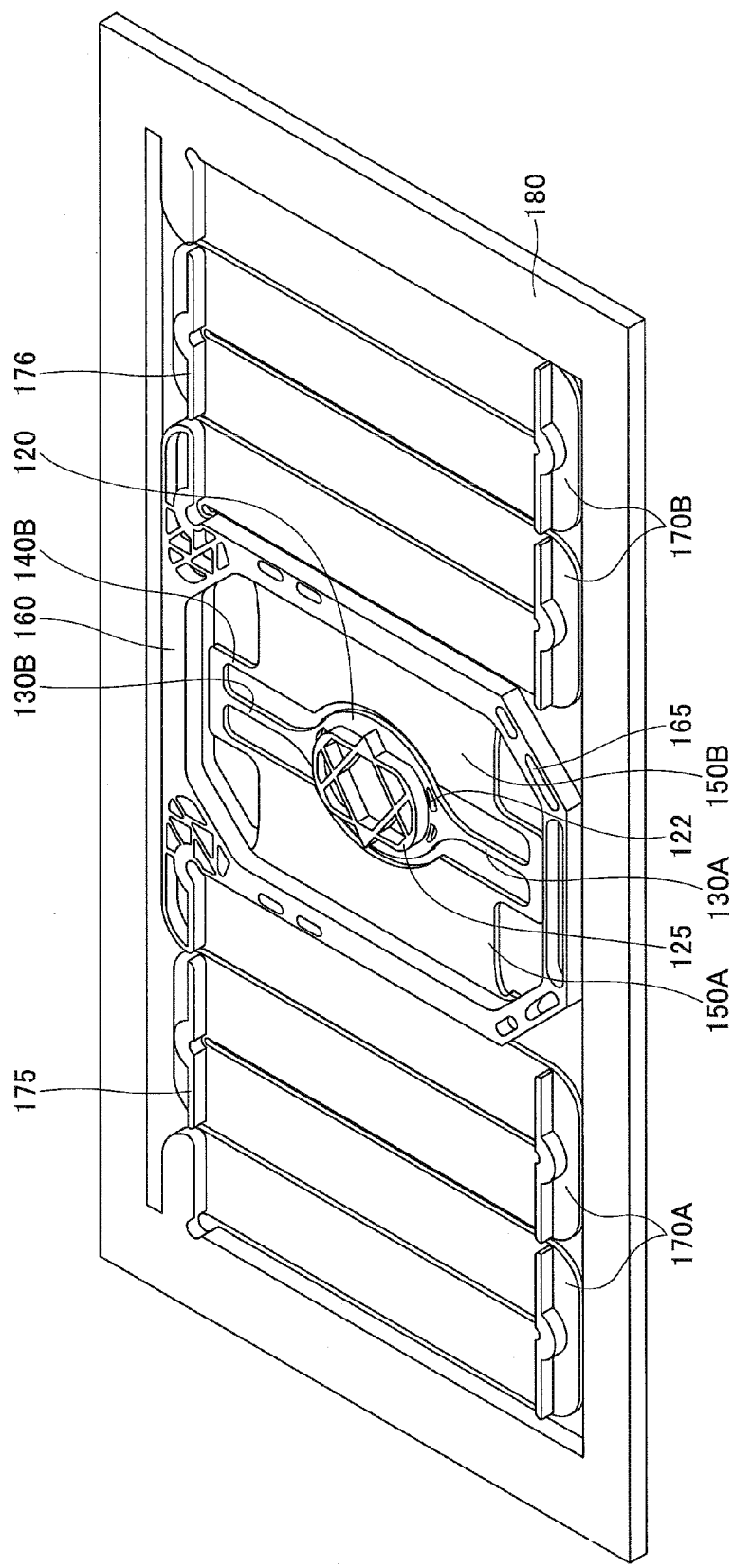
FIG. 2 is a perspective view illustrating an example of the optical scanner unit of the optical scanner apparatus of the first embodiment at a back surface side.

FIG. 2 is a perspective view illustrating an example of the optical scanner unit 100 of the optical scanner apparatus of the first embodiment at a back surface side. In FIG. 2, a rib 125 is provided at the back surface of the mirror support portion 120. By providing the rib 125, generation of distortion can be suppressed while driving the mirror 110, and the mirror 110 can be retained flat. The rib 125 is formed to have an outline that substantially matches the shape of the mirror 110. With this configuration, the entirety of the mirror 110 can be made flat. Further, by the slits 122 formed at the mirror support portion 120, stress transmitted from the torsion beams 130A and 130B can be dispersed in the mirror support portion 120 and the stress can be prevented from being transmitted to the rib 125.

The movable frame 160 is provided with lightening portions 165. The lightening portions 165 are recesses for lightening the movable frame 160. As the movable frame 160 has a function to support the first driving beams 150A and 150B, the movable frame 160 is formed to be thick. However, as the movable frame 160 itself is driven to be oscillated in the vertical direction, if its weight is heavy, the displacement becomes small and its sensitivity is lowered even when the same voltage is applied. Thus, by providing the lightening portions 165 in the movable frame 160 to lighten the movable frame 160, the sensitivity can be improved.

Furthermore, when the movable frame 160 is driven at 60 Hz, for example, if unnecessary resonance frequencies exist at multiples of 60 Hz (120 Hz, 180 Hz, 240 Hz . . . ), noise becomes large. In other words, it is preferable that unnecessary resonance frequencies do not exist near multiples of the drive frequency as oscillation characteristics. By lightening the movable frame 160, the unnecessary resonance frequencies become high frequencies and the unnecessary resonance frequencies can be moved far from near the multiples of the drive frequency. Further, even when the unnecessary resonance frequencies are multiples of the drive frequency, the influence is less as the frequency of the unnecessary resonance frequency is farther from 60 Hz, in other words, a higher frequency side. In other words, by lightening the movable frame 160, the unnecessary resonance frequencies become high frequencies and noise can be reduced.

Ribs 175 and 176 are provided at portions each of which connects adjacent driving beams of the second driving beams 170A and 170B at the back surface, respectively. By providing the ribs 175 and 176, each of the portions that connects the adjacent driving beams can be reinforced and the rigidity is increased to prevent the deformation. Hereinafter, with reference to FIG. 3, the ribs 175 and 176 are further explained.

Figure 3:
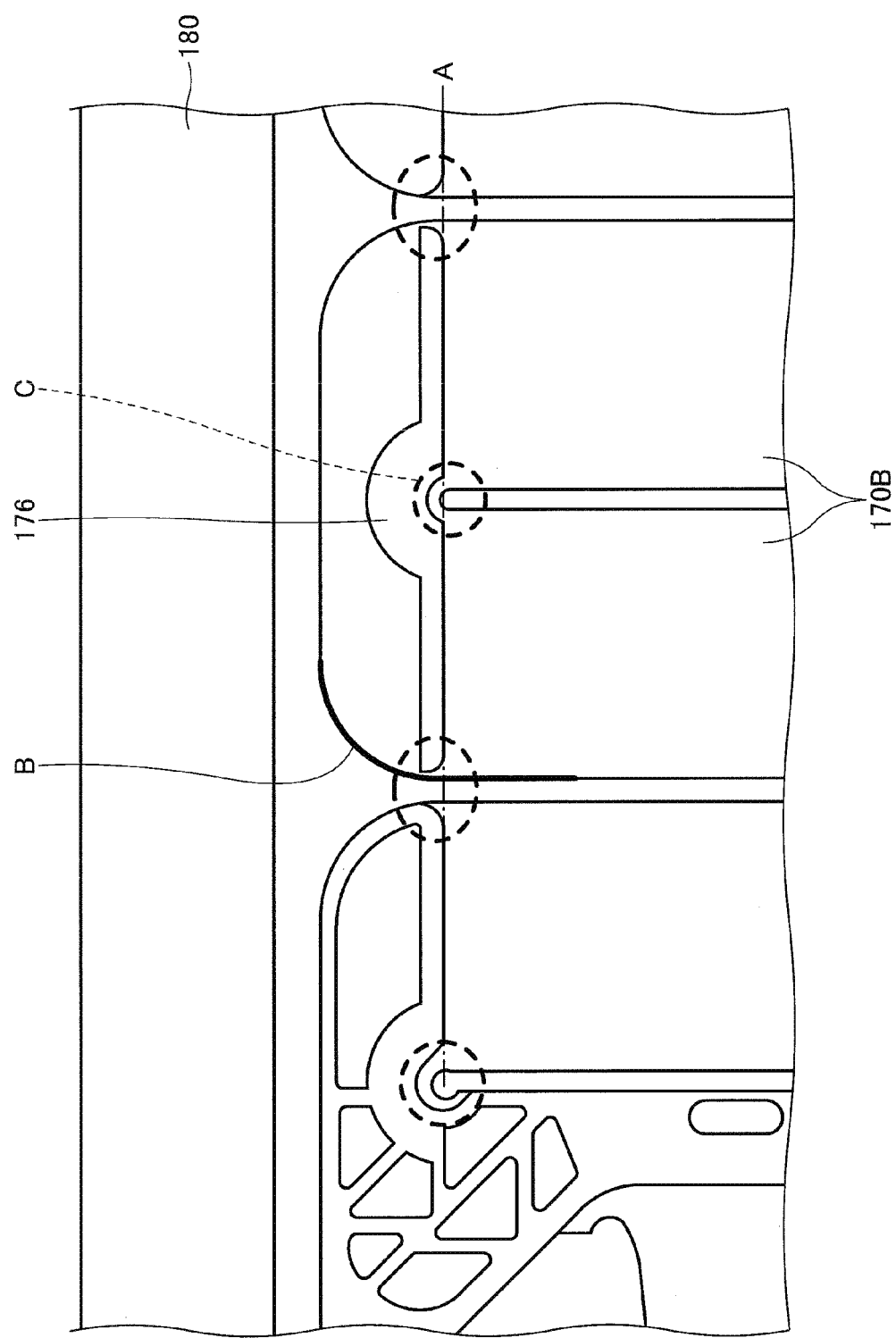
FIG. 3 is a partially enlarged plan view illustrating an example of a rib in FIG. 2.

FIG. 3 is a partially enlarged plan view illustrating an example of the rib 175 in FIG. 2. The optical scanner unit 100 may be formed by using a SOI (Silicon On Insulator) substrate including a support layer, a BOX (Buried Oxide) layer and an active layer, for example. At this time, in each of the second driving beams 170A and 170B, portions illustrated by chain lines A, each of which becomes a starting point of bending, become stress center portions. If the support layer, the BOX layer and the active layer exist at outline end surfaces B of these stress center portions, they are easy to be broken, in particular, the BOX layer made of $SiO_2$ is easily broken.

This means that the main cause of breaking of the second driving beams 170A and 170B is break of the BOX layer on the starting points of bending illustrated by the chain lines A, which become the stress center portions. Thus, the ribs 175 and 176 are provided at the stress center portions, and the ribs 175 and 176 are formed such that portions surrounded by broken lines C position inside of the outline end surfaces and further corners are rounded to disperse the stress. Here, an effect of providing each of the ribs is determined by its width and height. However, as it causes lowering of a primary resonance frequency if the volume is large, it is necessary to obtain a high deformation preventing effect with less volume. In the ribs 175 and 176, by providing a semicircular portion near an end portion of a slit portion between the adjacent driving beams, a high deformation preventing effect can be obtained with less volume.

Figure 4:
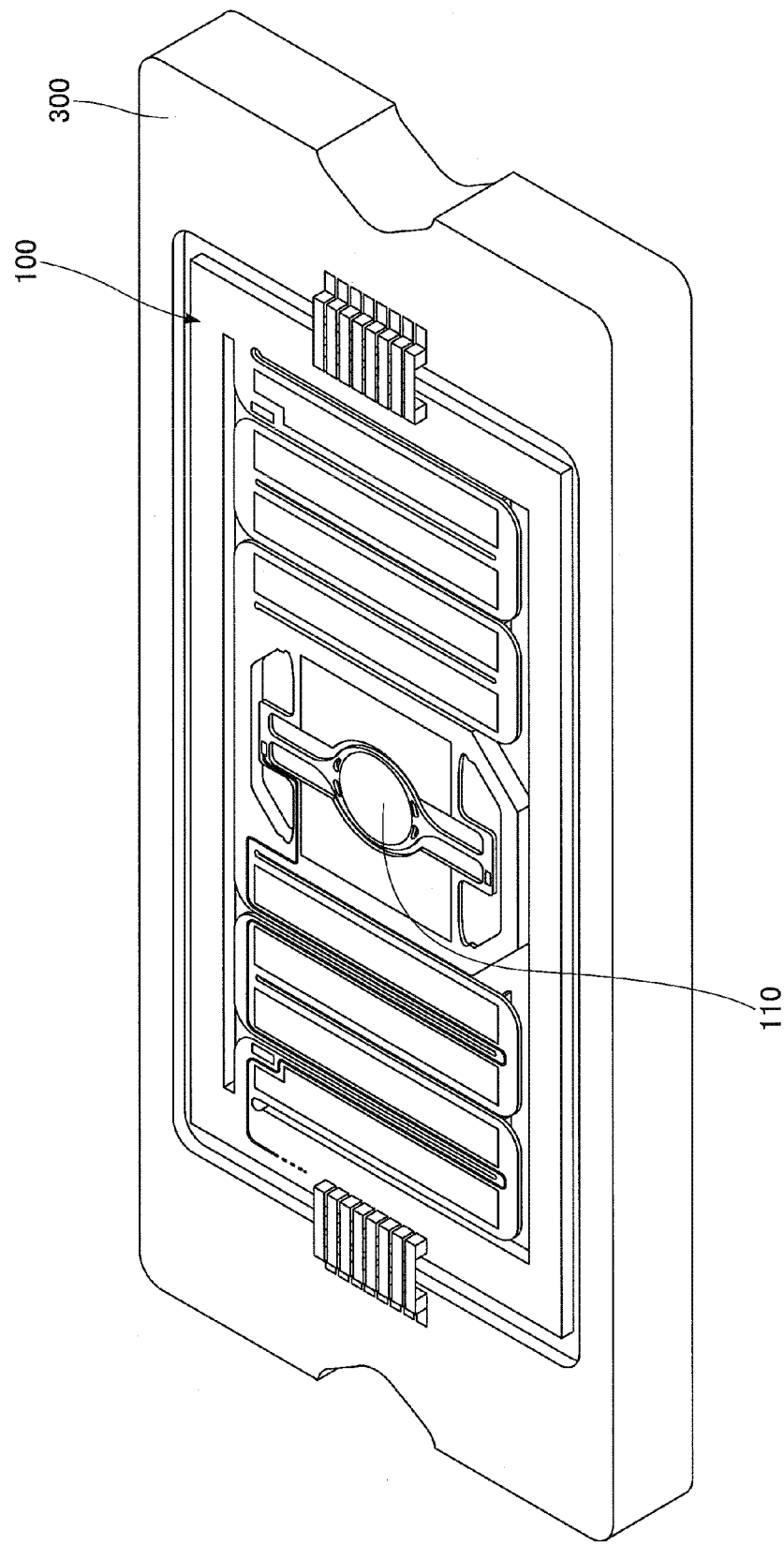
FIG. 4 is a perspective view illustrating an example of the optical scanner apparatus of the first embodiment (a package cover is not illustrated)
Figure 5:
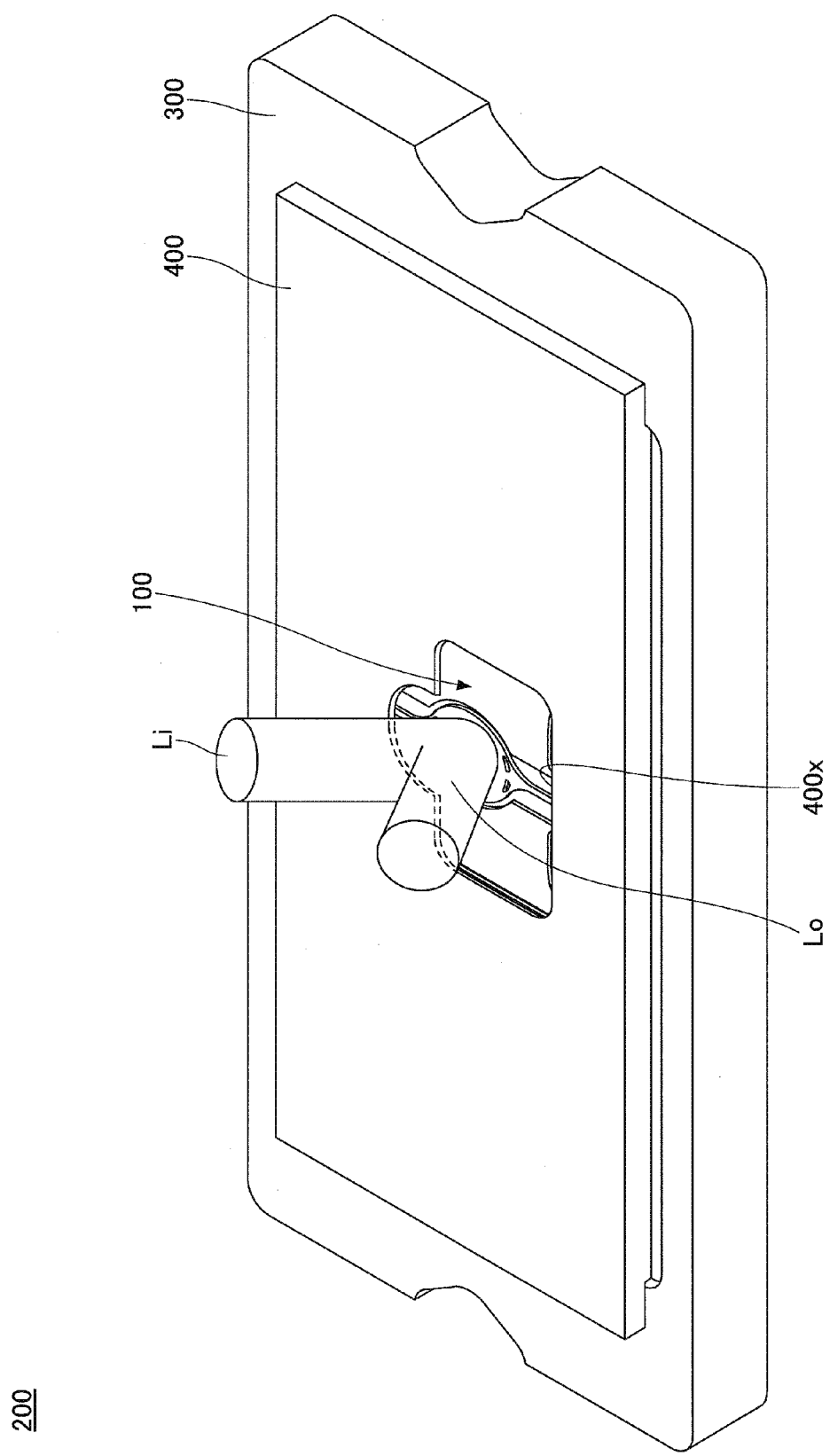
FIG. 5 is a perspective view illustrating an example of the optical scanner apparatus of the first embodiment (a package cover is illustrated)
Figure 6:
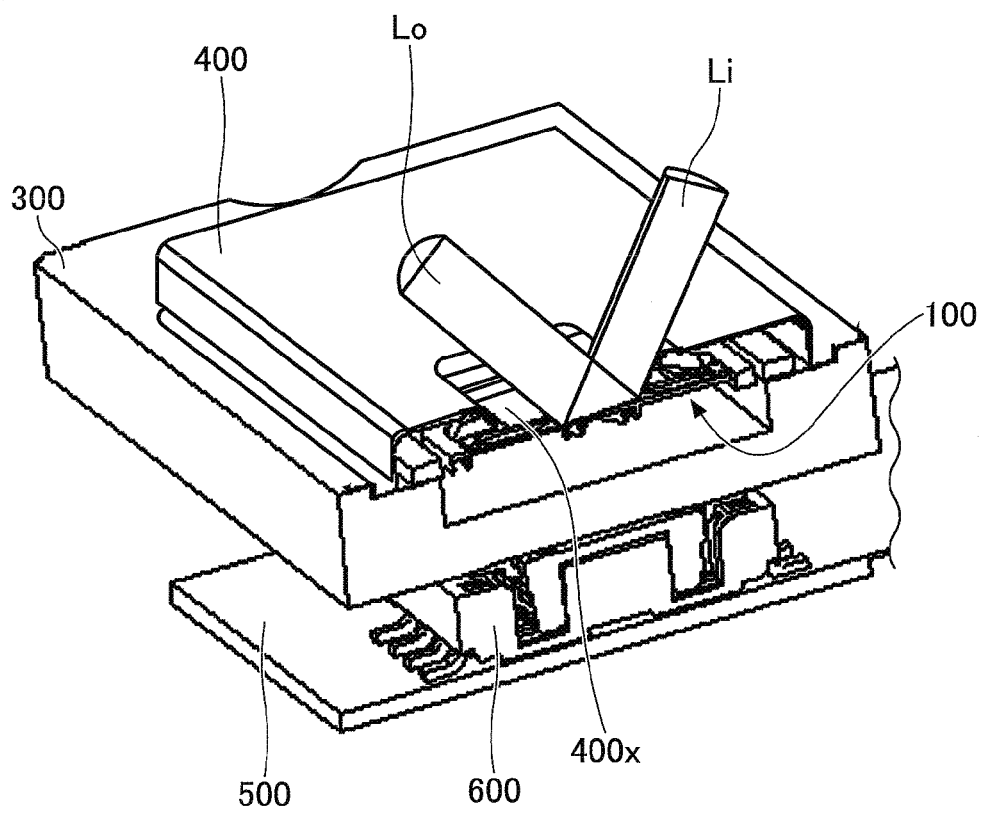
FIG. 6 is a cross-sectional perspective view illustrating an example of the optical scanner apparatus of the first embodiment.

FIG. 4 is a perspective view illustrating an example of an optical scanner apparatus 200 of the first embodiment (a package cover is not illustrated). FIG. 5 is a perspective view illustrating an example of the optical scanner apparatus 200 of the first embodiment (the package cover is illustrated). FIG. 6 is a cross-sectional perspective view illustrating an example of the optical scanner apparatus 200 of the first embodiment. As illustrated in FIG. 4 to FIG. 6, the optical scanner apparatus 200 includes the optical scanner unit 100, a ceramic package 300 on which the optical scanner unit 100 is mounted and a package cover 400 provided on the ceramic package 300 to cover the optical scanner unit 100. The optical scanner apparatus 200 may include a substrate 500, a control circuit 600 and the like at a lower side of the ceramic package 300.

In the optical scanner apparatus 200, the package cover 400 is provided with an open portion 400x substantially at its center portion for exposing the vicinity of the mirror 110. The open portion 400x is formed to have a shape that does not shut off the laser incident light Li to the mirror 110 and laser outgoing light Lo (scanning light) from the mirror 110. The open portion 400x is provided to have a smaller opening at a side through which the laser incident light Li passes than an opening at a side through which the laser outgoing light Lo passes. In other words, the open portion 400x is provided with a narrow substantially semicircular opening at the laser incident light Li side and a large substantially rectangular opening at the laser outgoing light Lo side. This is because for the laser incident light Li, as the laser incident light Li is input from a certain direction, it is only necessary to open that direction. On the other hand, for the laser outgoing light Lo, as the laser outgoing light Lo is scanned in two dimension, it is necessary to open the entire scanning range in order not to shut off the laser outgoing light Lo.

Figure 7:
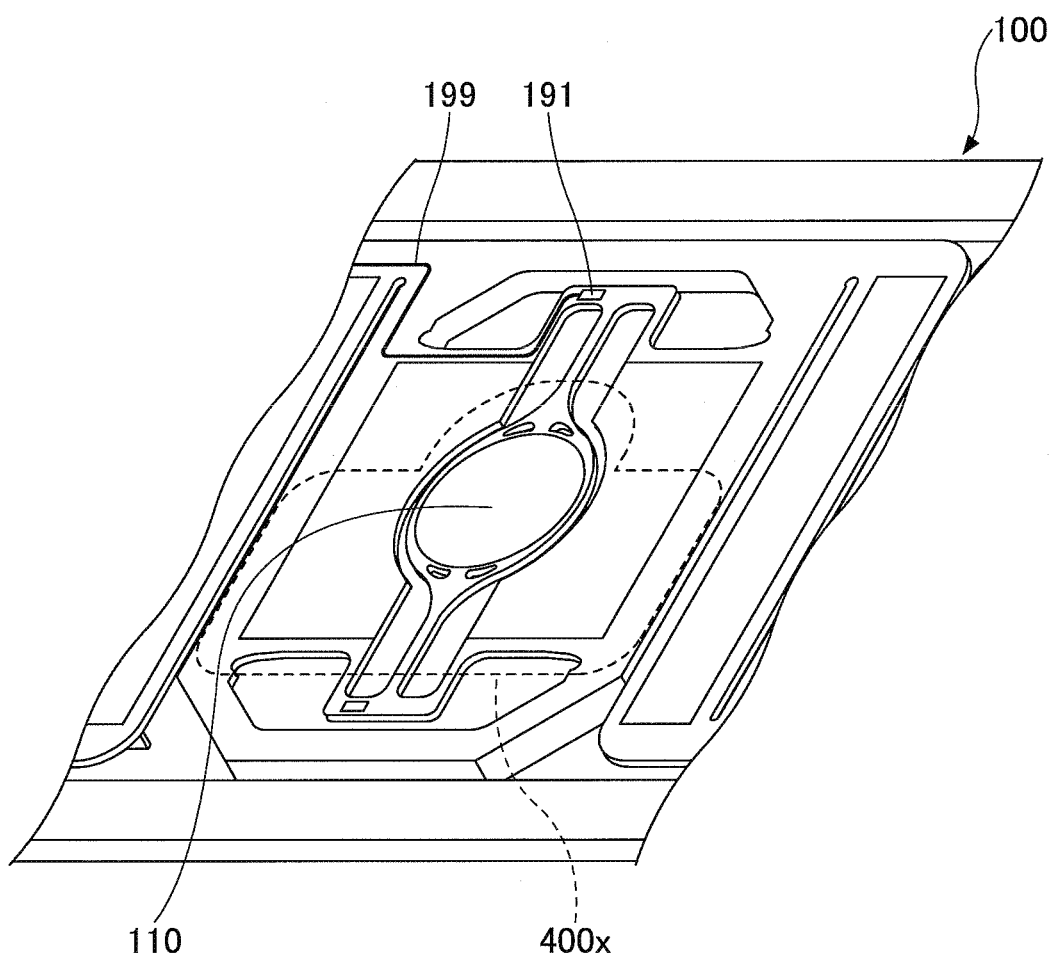
FIG. 7 is an enlarged perspective view illustrating an example of the optical scanner apparatus of the first embodiment near an open portion.

FIG. 7 is an enlarged perspective view illustrating an example of the optical scanner apparatus 200 of the first embodiment near the open portion 400x, and the open portion 400x is illustrated by a broken line in FIG. 7 for explanation purposes. As illustrated in FIG. 7, the open portion 400x does not expose the piezo-electric sensor 191 that is placed near the mirror 110 and the sensor interconnects 199 extended from the upper electrode and the lower electrode of the piezo-electric sensor 191. In other words, the package cover 400 covers the piezo-electric sensor 191 and the sensor interconnect 199 to prevent light irradiation on the piezo-electric sensor 191 and the sensor interconnects 199. A portion surrounded by the broken line is exposed within the open portion 400x.

Figure 8:
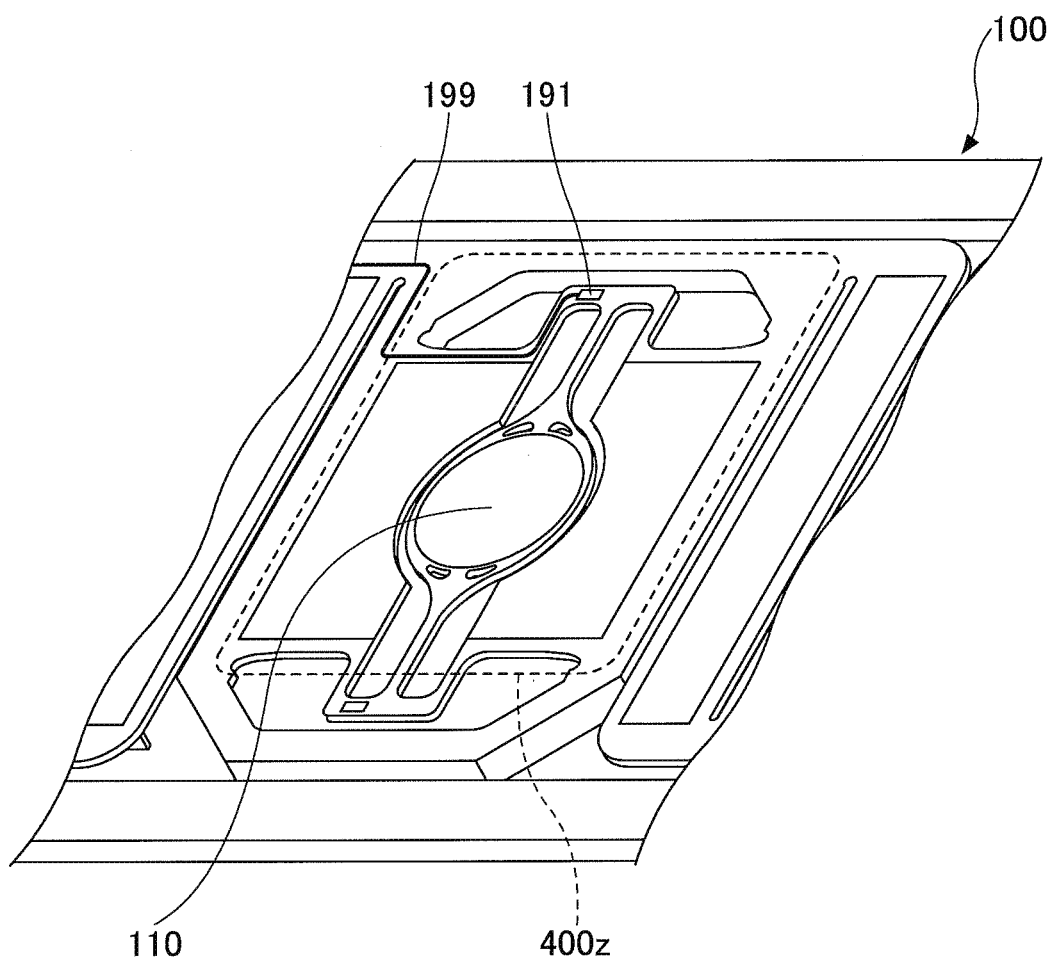
FIG. 8 is an enlarged perspective view illustrating an example of an optical scanner apparatus of a comparative example near an open portion.

A technical meaning of covering the piezo-electric sensor 191 and the sensor interconnects 199 by the package cover 400 is explained with reference to a comparative example. FIG. 8 is an enlarged perspective view illustrating an example of an optical scanner apparatus of a comparative example near an open portion. In FIG. 8, an open portion 400z having a substantially rectangular shape is provided to expose the piezo-electric sensor 191 and the sensor interconnects 199 in addition to exposing the mirror 110. In other words, the piezo-electric sensor 191 and the sensor interconnects 199 are not covered by the package cover. Thus, the light is irradiated also on the piezo-electric sensor 191 and the sensor interconnects 199.

Figure 9:
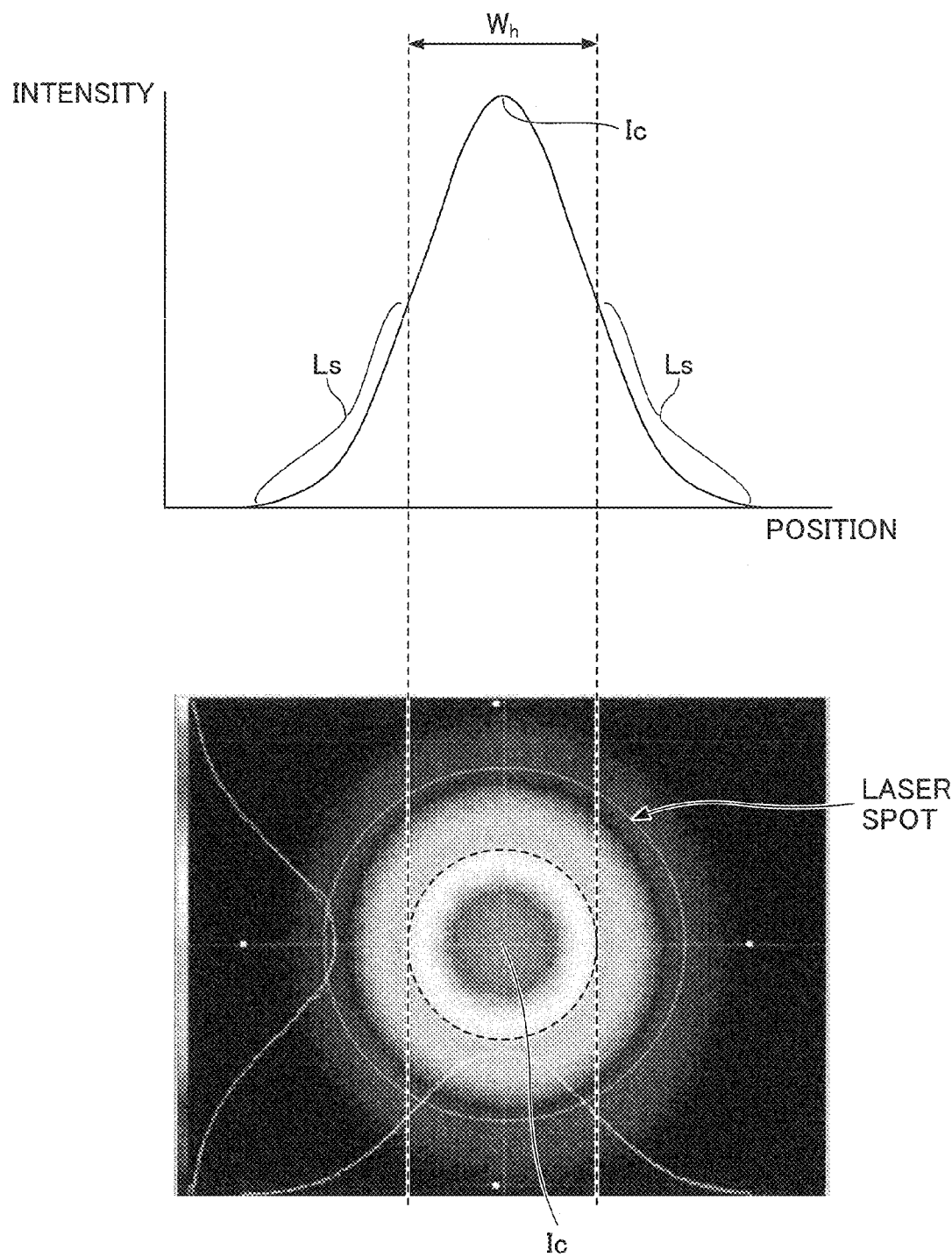
FIG. 9 is a view illustrating an example of intensity distribution of laser incident light Li.

Here, intensity distribution of the laser incident light Li is as illustrated in FIG. 9. In FIG. 9, "Ic" is a center of the intensity of the laser incident light Li, and "Wh" is a width (half width, full width at half maximum) at which the intensity of the laser incident light Li becomes half of that at the center Ic of the intensity. The half width Wh part of the laser incident light Li is mainly irradiated on the mirror 110, and at that time, outside light Ls of the half width (stray light) is irradiated on the vicinity of the mirror 110 including the piezo-electric sensor 191 and the sensor interconnects 199. Further, in addition to the outside light Ls of the half width of the laser incident light Li, ambient light such as fluorescent light, sunlight or the like may be irradiated.

The present inventors have found from following experimental results that the output signal of the piezo-electric sensor 191 varies if the outside light Ls of the half width of the laser incident light Li or the ambient light is irradiated on the piezo-electric sensor 191 or the sensor interconnects 199. Here, driving of the mirror 110 in the horizontal direction is controlled based on the output signal of the piezo-electric sensor 191. Thus, if the output signal of the piezo-electric sensor 191 varies, the oscillation angle of the mirror 110 in the horizontal direction cannot be accurately detected and the driving of the mirror 110 in the horizontal direction cannot be appropriately controlled.

Experiments performed by the present inventors are explained with reference to FIG. 10. First, laser light was directly irradiated on a portion "D" of the optical scanner unit 100 in FIG. 10 under a status that the package cover 400 was removed, and the variation of an output signal of the piezo-electric sensor 191 was confirmed. As a result, as illustrated in FIG. 11A, it was confirmed that the output signal of the piezo-electric sensor 191 drastically varied once at a moment when the laser light was switched from off to on, and then gradually varied. It can be considered that the output of the piezo-electric sensor 191 gradually varied because the first driving beam 150B and the driving source 151B are heated by the laser light, and physical property values of silicon that composes the optical scanner unit 100 varied and the resonance frequency was shifted.

Figure 10:
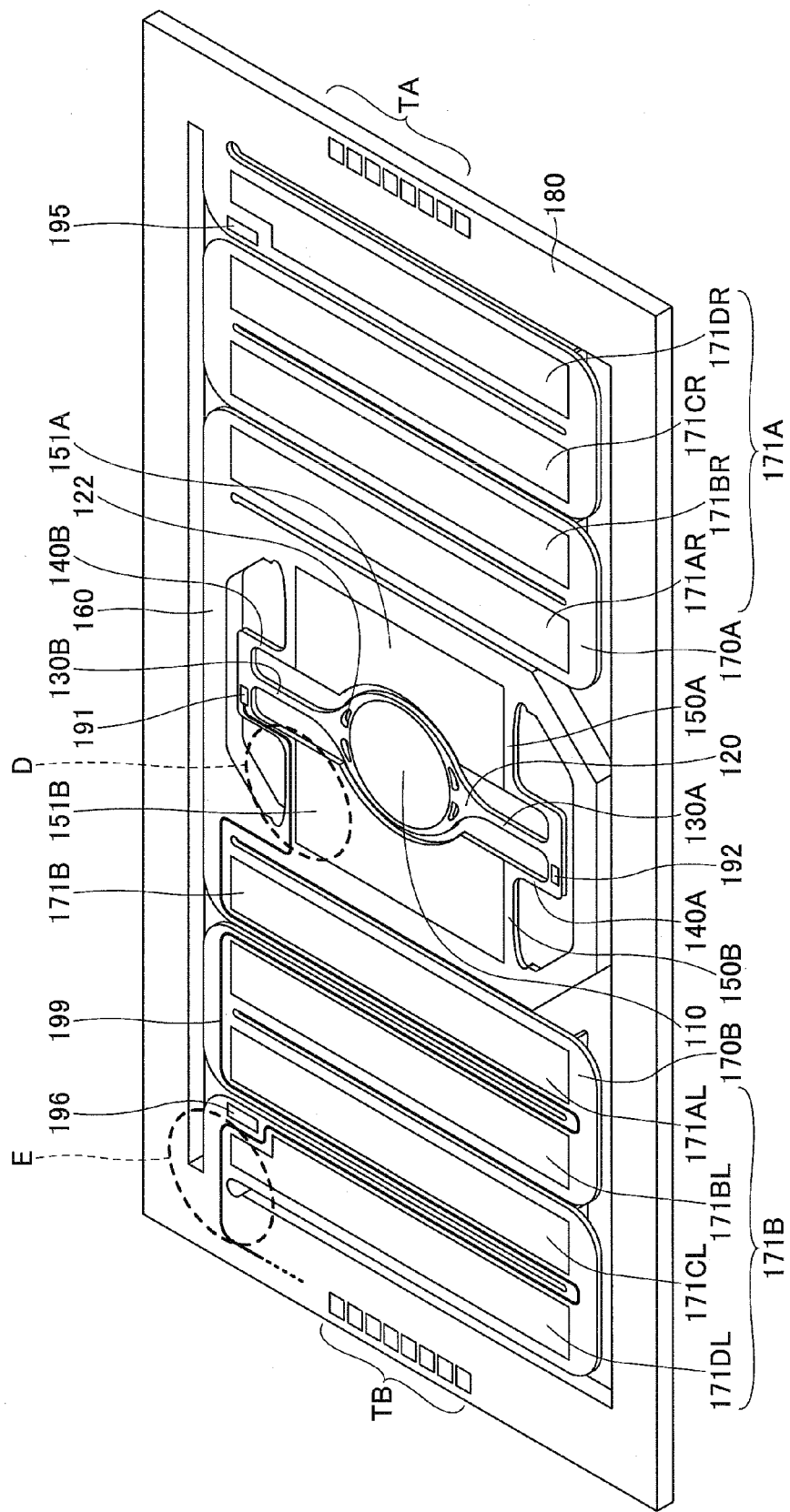
FIG. 10 is a perspective view for explaining positions on which laser light is directly irradiated in experiments.

Next, the laser light was directly irradiated at a portion "E" of the optical scanner unit 100 as illustrated in FIG. 10 under a status that the package cover 400 was removed, and the variation of an output signal of the piezo-electric sensor 191 was confirmed at that time. As a result, as illustrated in FIG. 11B, it was confirmed that the output signal of the piezo-electric sensor 191 drastically varied once at a moment when the laser light was switched from off to on, and then the status was kept. Further, as illustrated in FIG. 11C, it was confirmed that the output signal of the piezo-electric sensor 191 varied in accordance with switching on and off of laser light at a high frequency of 100 KHz on the portion "E" in FIG. 10.

As the portion "E" in FIG. 10 is sufficiently far from the piezo-electric sensor 191, it can be considered that the influence of generation of heat near the portion "E" in FIG. 10 on the piezo-electric sensor 191 can be ignored when the laser light is directly irradiated on the portion "E" in FIG. 10. Further, as the output signal of the piezo-electric sensor 191 varied in accordance with switching on and off of laser light at 100 KHz, it is hardly considered that the heat influenced. At this time, as variation of capacitance is confirmed, it can be considered that the output signal of the piezo-electric sensor 191 varied because leak current to silicon composing the optical scanner unit 100 occurred by irradiating the laser light. In other words, it can be considered that the drastic change of the output signal of the piezo-electric sensor 191 occurred because a parasitic component of the interconnect formed on silicon composing the optical scanner unit 100 generated leak current by a photoelectric effect.

As such, there are two kinds of modes, a mode in which the output signal of the piezo-electric sensor 191 drastically varies and a mode in which the output signal of the piezo-electric sensor 191 gradually varies, and those occur due to different causes. When the laser light is directly irradiated on the portion "D" in FIG. 10, the mode in which the output signal of the piezo-electric sensor 191 drastically varies and the mode in which the output signal of the piezo-electric sensor 191 gradually varies occur at the same time. Further, when the laser light is directly irradiated on the portion "E" in FIG. 10, only the mode in which the output signal of the piezo-electric sensor 191 drastically varies occurs.

Here, the fact that the output signal of the piezo-electric sensor 191 varies gradually in accordance with shifting of a resonance frequency due to increasing of temperature can be confirmed as follows. FIG. 12A illustrates variation of the oscillation angle of the mirror 110 in the horizontal direction by a drive frequency. For example, when the light is not irradiate (light off) at normal temperature, the oscillation angle in the horizontal direction becomes maximum at the drive frequency=f0 [Hz] (f0 [Hz] is a resonance frequency). Further, when the light is irradiated, frequency characteristics are shifted due to increasing of temperature, and the oscillation angle in the horizontal direction becomes maximum at the drive frequency=f0−15 [Hz] (f0−15 [Hz] is a resonance frequency). At this time, by comparing at the drive frequency=f0+15 [Hz], the oscillation angle in the horizontal direction becomes smaller than the case when the light is off.

Here, an experimental result in which variation of an output signal of the piezo-electric sensor 191 was confirmed when laser light was irradiated on the mirror 110 in the optical scanner unit 100 (comparative example) that is covered by the package cover 400 provided with the open portion 400z illustrated in FIG. 8.

FIG. 12B illustrates variation of an output signal of the piezo-electric sensor 191 under a status that driving was started at normal temperature, light off and drive frequency=f0−15 [Hz], and the light was irradiated thereafter.

Here, a left-upper side in FIG. 12B illustrates an output signal of the piezo-electric sensor 191, a left-loser side illustrates a horizontal driving signal, and a right-side is a view illustrating the left-side views with an enlarged temporal axis (this is similar for FIG. 12C and FIG. 12D).

When the temperature increases by irradiating the light, and the resonance frequency is shifted from f0 [Hz] to f0−15 [Hz], the oscillation angle at the drive frequency=f0−15 [Hz] increases as illustrated in FIG. 12A. Thus, the amplitude of the output signal of the piezo-electric sensor 191 gradually increases in FIG. 12B.

FIG. 12C illustrates variation of an output signal of the piezo-electric sensor 191 under a status that driving was started at normal temperature, light off and drive frequency=f0 [Hz], and the light was irradiated thereafter. Even when the temperature increases by irradiating the light, and the resonance frequency is shifted from f0 [Hz] to f0−15 [Hz], the oscillation angle at the drive frequency=f0 [Hz] does not change largely as illustrated in FIG. 12A. Thus, variation of the amplitude of the output signal of the piezo-electric sensor 191 is small in FIG. 12C.

FIG. 12D illustrates variation of an output signal of the piezo-electric sensor 191 under a status that driving was started at normal temperature, light off and drive frequency=f0+15 [Hz], and the light was irradiated thereafter. When the temperature increases by irradiating the light, and the resonance frequency is shifted from f0 [Hz] to f0−15 [Hz], the oscillation angle at the drive frequency=f0+15 [Hz] decreases as illustrated in FIG. 12A. Thus, the amplitude of the output signal of the piezo-electric sensor 191 gradually decreases in FIG. 12D.

As such, the output signal of the piezo-electric sensor 191 gradually varies due to the shift of the resonance frequency of the mirror 110 due to increasing of temperature. The wave form illustrated in FIG. 11A is similar to the wave form illustrated in each of FIG. 12B to FIG. 12D. From these facts, it can be said that the variation of an output signal of the piezo-electric sensor 191 that occurs when directly irradiating the laser light on the portion "D" of the optical scanner unit 100 in FIG. 10 is caused by the shift of the resonance frequency of the mirror 110 due to increasing of temperature.

As such, it was confirmed that the output signal of the piezo-electric sensor 191 varied when the outside light Ls of the half width of the laser incident light Li or the ambient light was irradiated on the piezo-electric sensor 191 or the sensor interconnects 199. In particular, as the mode in which the output signal of the piezo-electric sensor 191 drastically varies is high speed variation that occurs even by switching on and off of laser light at 100 KHz, it is difficult to electrically correct the variation and a structural measurement is necessary.

Thus, in this embodiment, the piezo-electric sensor 191 and the sensor interconnects 199 of the optical scanner unit 100 are configured to be covered by the package cover 400. In other words, the package cover 400 except the open portion 400x functions as a shading unit, and shuts off the piezo-electric sensor 191 and the sensor interconnects 199 from the outside light of the half width of the laser incident light Li or the ambient light. With this configuration, generation of the mode in which the output signal of the piezo-electric sensor 191 drastically varies and the mode in which the output signal of the piezo-electric sensor 191 gradually varies as explained by the above experiments can be prevented.

Here, the configuration in which the piezo-electric sensor 191 and the sensor interconnects 199 of the optical scanner unit 100 are covered by the package cover 400 has a sufficient effect to prevent the variation of an output signal of the piezo-electric sensor 191. However, a case may happen in which the outside light Ls of the half width of the laser incident light Li or the ambient light is irradiated from a space between the optical scanner unit 100 and the package cover 400 with a shallow angle. A heat buffer layer and a reflection film may be provided in order to remove a possibility of generation of variation of an output signal of the piezo-electric sensor 191 by the light irradiated through such a space.

Figure 13:
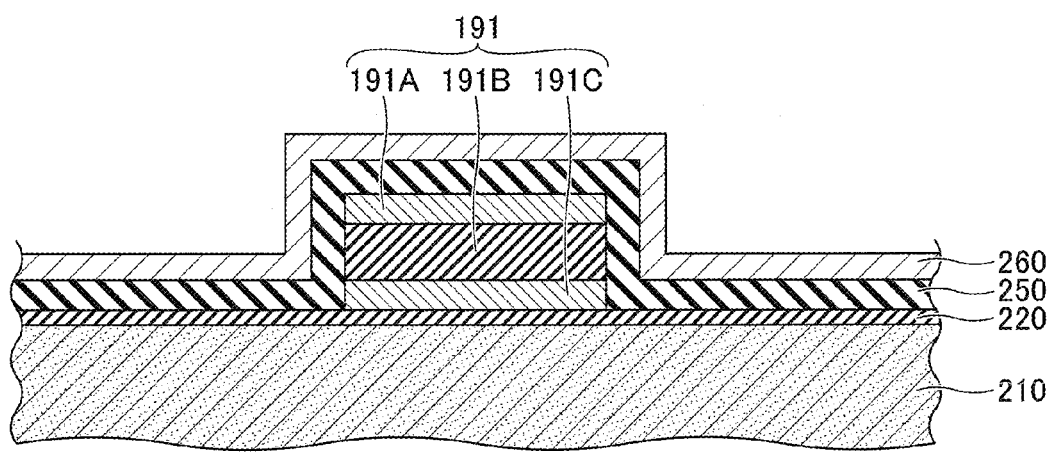
FIG. 13 is a cross-sectional view illustrating an example in which a heat buffer layer and a reflection film are provided on the piezo-electric sensor.

FIG. 13 is a cross-sectional view illustrating an example in which a heat buffer layer 250 and a reflection film 260 are provided on the piezo-electric sensor. As illustrated in FIG. 13, a piezo-electric sensor 191 is formed on silicon 210 via an insulating film 220 in the optical scanner unit 100. The piezo-electric sensor 191 includes an upper electrode 191A, a piezo-electric element 191B and a lower electrode 191C.

The heat buffer layer 250 may be provided to cover the piezo-electric sensor 191 and the sensor interconnects 199 (not illustrated in FIG. 13). The heat buffer layer 250 may be provided to an entire surface of the front surface side of the optical scanner unit 100 including the piezo-electric sensor 191 and the sensor interconnects 199. The heat buffer layer 250 is a layer that absorbs and disperses heat from outside, and has a function to protect the piezo-electric sensor 191 and the sensor interconnects 199 such that heat does not easily transmit to the piezo-electric sensor 191 and the sensor interconnects 199. It is preferable that the heat buffer layer 250 is composed of a material whose coefficient of thermal conductivity is low and whose specific heat capacity (heat capacity of unit volume) is large.

As the material of the heat buffer layer 250, an oxide film such as an alumina film ($Al_2O_x$), a titanium oxide ($TiO_x$) or the like, or an amorphous film such as a silicon oxide film ($SiO_x$) or the like may be used, for example. As the material of the heat buffer layer 250, epoxy resin, photoresist or the like may be used, for example. The thickness of the heat buffer layer 250 may be about 10 to 1000 nm, for example. The heat buffer layer 250 may be formed by an ALD (Atomic Layer Deposition) method, for example.

The heat buffer layer 250 may not be a layer that absorbs and disperses heat from outside, but may be a layer that insulates heat from outside. In this case, as the material of the heat buffer layer 250, a porous film such as a porous alumina film ($Al_2O_x$), a porous glass film ($SiO_x$), a porous titanium oxide ($TiO_x$) or the like may be used, for example.

The reflection film 260 may be provided to cover the heat buffer layer 250. The reflection film 260 has a function to reflect outside light Ls of the half width of the laser incident light Li or the ambient light, and to prevent generation of heat at an irradiated portion. It is preferable that the reflection film 260 is composed of a material whose reflectance is high. As the material of the reflection film 260, silver, a silver alloy, alminium, an alminium alloy, gold, a gold alloy or the like may be used, for example. The thickness of the reflection film 260 may be about 10 to 1000 nm, for example. The reflection film 260 may be formed by a sputtering method, for example.

Only the heat buffer layer 250 may be provided to cover the piezo-electric sensor 191 and the sensor interconnects 199, or only the reflection film 260 may be provided to cover the piezo-electric sensor 191 and the sensor interconnects 199. However, when the reflection film 260 is composed of an electrical conductive material, it is necessary to provide the reflection film 260 on the piezo-electric sensor 191 and the sensor interconnects 199 via an insulating layer.

Figure 14:
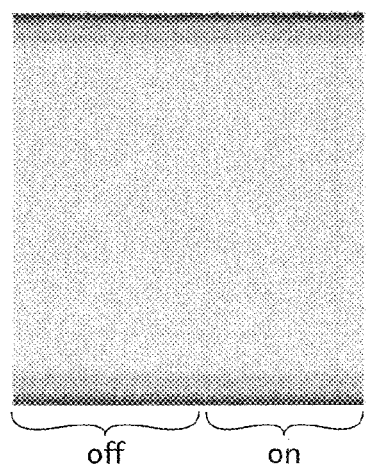
FIG. 14 is a view illustrating an example of an experimental result in which variation of an output signal of the piezo-electric sensor is reduced.

FIG. 14 is a view illustrating an example of an experimental result in which variation of an output signal of the piezo-electric sensor is reduced. Specifically, an experimental result is illustrated in which the variation of an output signal of the piezo-electric sensor 191 when the laser light is irradiated on the mirror 110 in the optical scanner unit 100 covered by the package cover 400 provided with the open portion 400x illustrated in FIG. 7. Here, for the optical scanner unit 100 used in the experiment, the heat buffer layer 250 that covers the piezo-electric sensor 191 and the sensor interconnects 199, and the reflection film 260 that covers the heat buffer layer 250 are provided.

As illustrated in FIG. 14, even when the laser light on the mirror 110 was switched from off to on, the output signal of the piezo-electric sensor 191 does not vary. In other words, it was confirmed that the output signal of the piezo-electric sensor 191 does not vary even when the laser light irradiated on the mirror 110 is changed from off to on by providing the package cover 400, the heat buffer layer 250 and the reflection film 260 which cover the piezo-electric sensor 191 and the sensor interconnects 199. According to studies by the present inventors, as the variation of an output signal of the piezo-electric sensor 191 was largely reduced only with the package cover 400 that covers the piezo-electric sensor 191 and the sensor interconnects 199, either of or both of the heat buffer layer 250 and the reflection film 260 may be provided in accordance with necessity.

As such, in the optical scanner apparatus of the first embodiment 200, the package cover 400 covers the piezo-electric sensor 191 that detects the inclination in the horizontal direction and the sensor interconnects 199 connected to it to prevent the irradiation of the light on the piezo-electric sensor 191 and the sensor interconnects 199.

With this configuration, leak current and shift of a resonance frequency of the mirror 110 that occur due to the irradiation of light on the piezo-electric sensor 191 and the sensor interconnects 199 can be suppressed, and the variation of an output signal of the piezo-electric sensor 191 can be reduced. Further, by providing the heat buffer layer 250 or the reflection film 260 such as to cover the piezo-electric sensor 191 and the sensor interconnects 199, the variation of an output signal of the piezo-electric sensor 191 can be further reduced. As a result, an oscillation angle of the mirror 110 in the horizontal direction can be accurately detected and driving of the mirror 110 in the horizontal direction can be appropriately controlled.

(Alternative Example of First Embodiment)

In an alternative example of the first embodiment, a cover glass on the package cover in the optical scanner apparatus. Here, in the alternative example of the first embodiment, it is to be noted that, in the explanation of the drawings, the same components as explained above in the first embodiment are given the same reference numerals, and explanations are not repeated.

Figure 15:
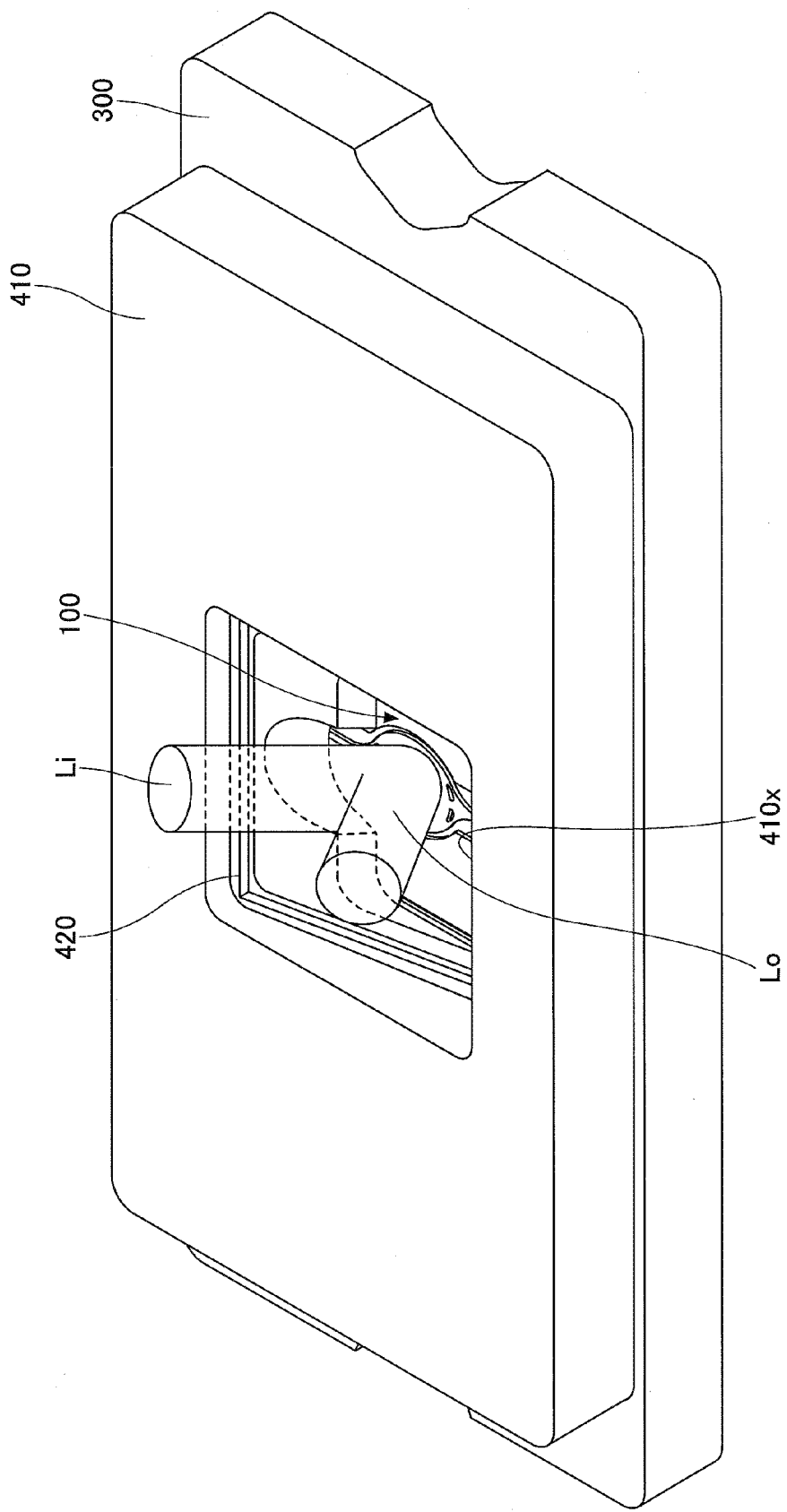
FIG. 15 is a perspective view illustrating an alternative example of the optical scanner apparatus of the first embodiment.
Figure 16:
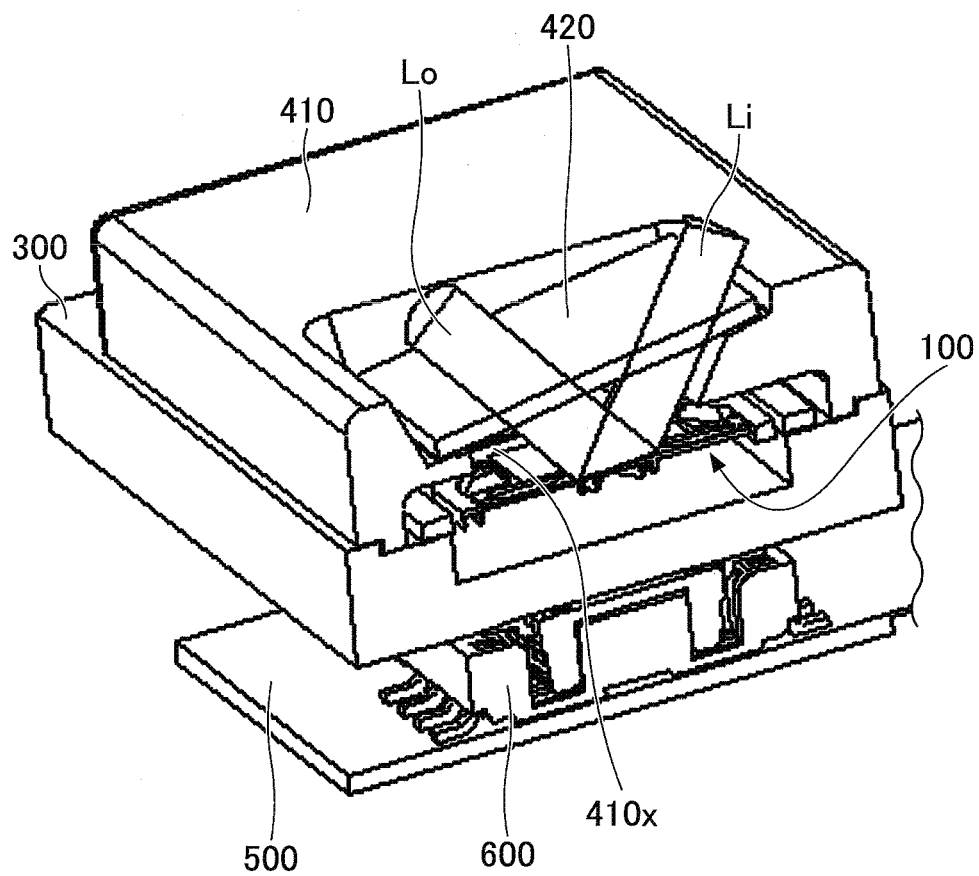
FIG. 16 is a cross-sectional perspective view illustrating the alternative example of the optical scanner apparatus of the first embodiment.

FIG. 15 is a perspective view illustrating an example of an optical scanner apparatus 200A of an alternative example of the first embodiment. FIG. 16 is a cross-sectional perspective view illustrating an alternative example of the optical scanner apparatus 200A of the first embodiment. As illustrated in FIG. 15 and FIG. 16, the optical scanner apparatus 200A includes the optical scanner unit 100, the ceramic package 300 on which the optical scanner unit 100 is mounted and a package cover 410 that is provided on the ceramic package 300 to cover the optical scanner unit 100. The optical scanner apparatus 200A may include the substrate 500 and the control circuit 600 at a lower side of the ceramic package 300.

In the optical scanner apparatus 200A, the package cover 410 is provided with an open portion 410*x* substantially at its center portion for exposing the vicinity of the mirror 110. The open portion 410*x* is formed to have a shape that does not shut off the laser incident light Li to the mirror 110 and the laser outgoing light Lo (scanning light) from the mirror 110. Further, a cover glass 420 that transmits the laser incident light Li and the laser outgoing light Lo is provided to cover the open portion 410*x*. With this configuration, in the optical scanner apparatus 200A, the optical scanner unit 100 is sealed by the ceramic package 300 and the package cover 410 provided with the cover glass 420. Similar to the reason for the open portion 400*x*, the open portion 410*x* is provided to have a smaller opening at a side through which the laser incident light Li passes than an opening at a side through which the laser outgoing light Lo passes.

Figure 17:
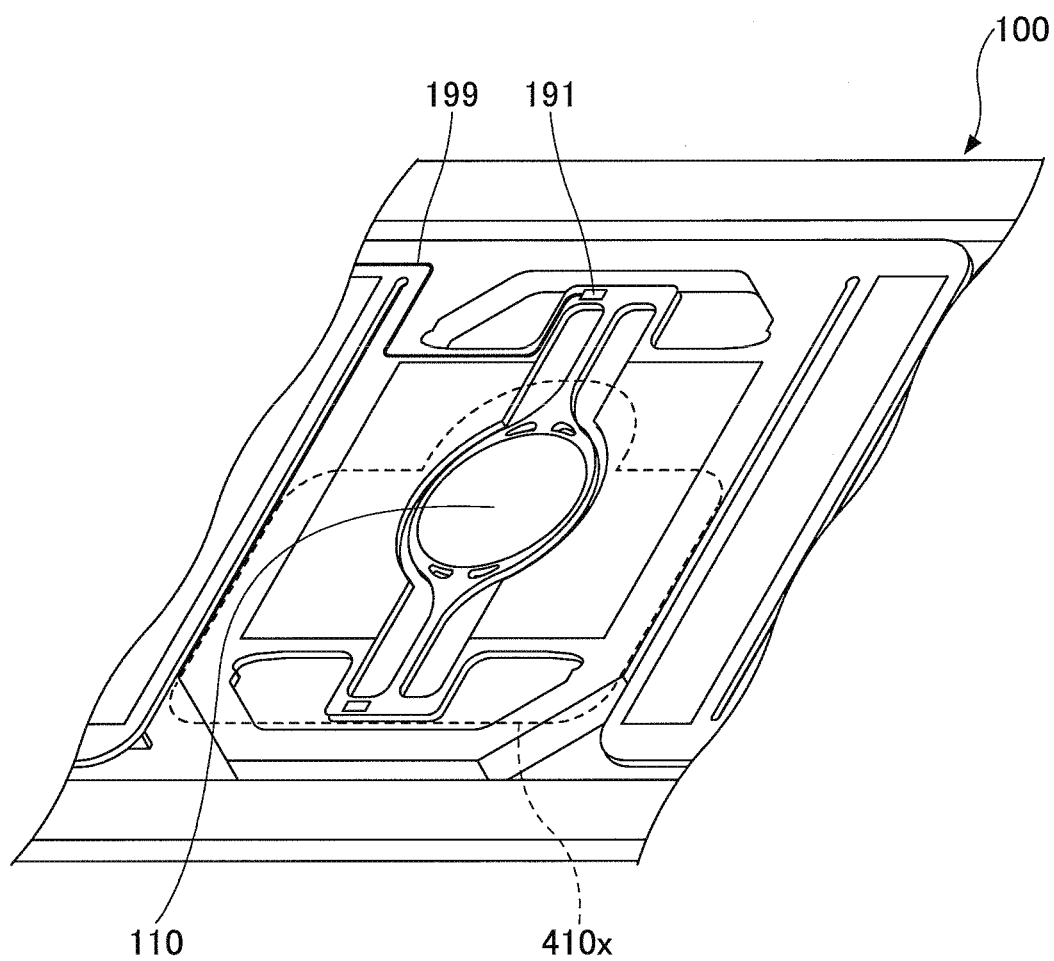
FIG. 17 is an enlarged perspective view illustrating the alternative example of the optical scanner apparatus of the first embodiment near the open portion.

As illustrated in FIG. 17, the open portion 410*x* does not expose the piezo-electric sensor 191 that is placed near the mirror 110 and the sensor interconnects 199 extended from the upper electrode and the lower electrode of the piezo-electric sensor 191. In other words, the package cover 410 except the open portion 410*x* functions as a shading unit, and shuts off the piezo-electric sensor 191 and the sensor interconnects 199 from the outside light of the half width of the laser incident light Li or the ambient light. With this configuration, generation of the mode in which the output signal of the piezo-electric sensor 191 drastically varies and the mode in which the output signal of the piezo-electric sensor 191 gradually varies as explained by the above experiments can be prevented. FIG. 17 is a perspective view illustrating an example near the mirror 110, and in FIG. 17, the open portion 410*x* is illustrated by a broken line for explanation purposes. The portion surrounded by the broken line is exposed within the open portion 410*x*.

As such, the optical scanner apparatus 200A may have a sealed structure in which the cover glass 420 is provided to the package cover 410. In such a case as well, as the package cover 410 covers the piezo-electric sensor 191 and the sensor interconnects 199 to prevent the irradiation of the light on the piezo-electric sensor 191 and the sensor interconnect 199, similar to the first embodiment, variation of an output signal of the piezo-electric sensor 191 can be reduced. As a result, the oscillation angle of the mirror 110 in the horizontal direction can be accurately detected and driving of the mirror 110 in the horizontal direction can be appropriately controlled. Further, similar to the first embodiment, the heat buffer layer 250 or the reflection film 260 may be provided in accordance with necessity.

Although a preferred embodiment of the optical scanner apparatus has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention.

For example, a shading structure that prevents the irradiation of light on the piezo-electric sensor 191 and the sensor interconnects 199 is actualized by forming an appropriate shape for the open portion of the package cover in the above embodiments. However, the open portion of the package cover may be largely formed such that the piezo-electric sensor 191 and the sensor interconnects 199 are exposed and a shading member for preventing the irradiation of the light on the piezo-electric sensor 191 and the sensor interconnects 199 may be provided near the mirror 110, separately from the package cover.

According to the embodiment, an optical scanner apparatus capable of reducing variation of an output signal of a sensor that detects an oscillation angle of a mirror is provided.

What is claimed is:

1. An optical scanner apparatus that oscillates a mirror to scan incident light, comprising:
   an optical scanner unit that includes a sensor that detects an oscillation angle of the mirror and an interconnect connected to the sensor; and
   a cover that shades the sensor and the interconnect from stray light of the incident light and ambient light,
   wherein the cover is provided with an open portion having a shape that does not block the incident light from reaching the mirror and that does not block scanning light from the mirror,
   the open portion including, in a planar view,
      a substantially semicircular opening portion at a side through which the incident light passes, and
      a substantially rectangular opening portion at a side through which the scanning light passes.

2. The optical scanner apparatus according to claim 1, further comprising:
   a package on which the optical scanner unit is mounted, and
   wherein the cover is provided on the package and the optical scanner unit, and covering the optical scanner unit.

3. The optical scanner apparatus according to claim 1, wherein at the open portion, the substantially semicircular opening portion at the side through which the incident light passes is made smaller than the substantially rectangular opening portion at the side through which the scanning light passes.

4. The optical scanner apparatus according to claim 1, wherein the incident light is laser light, and the stray light of the incident light is outside light of the half width of the laser light.

5. The optical scanner apparatus according to claim 1, further comprising:
   a heat buffer layer provided on the sensor and the interconnect.

6. The optical scanner apparatus according to claim 5, further comprising:
   a reflection film provided on the heat buffer layer.

7. The optical scanner apparatus according to claim 1, further comprising:
   a reflection film provided on the sensor and the interconnect via an insulating layer.

8. The optical scanner apparatus according to claim 1, wherein the optical scanner unit includes a beam provided around the mirror,
   wherein the sensor is provided at the beam, and
   wherein the cover is provided on the beam, the sensor and the inter connect of the optical scanner unit.

* * * * *